(12) United States Patent
Swamy

(10) Patent No.: US 11,485,557 B2
(45) Date of Patent: *Nov. 1, 2022

(54) PACKAGE FOR AN OPHTHALMIC DEVICE HAVING A MULTILAYER LIDSTOCK CONTAINING A CYCLIC OLEFIN SEAL LAYER

(71) Applicant: Johnson & Johnson Vision Care, Inc., Jacksonville, FL (US)

(72) Inventor: Jay Swamy, Jacksonville, FL (US)

(73) Assignee: Johnson & Johnson Vision Care, Inc., Jacksonville, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/126,229

(22) Filed: Dec. 18, 2020

(65) Prior Publication Data

US 2021/0188513 A1 Jun. 24, 2021

Related U.S. Application Data

(63) Continuation of application No. 15/987,418, filed on May 23, 2018, now Pat. No. 10,899,521.

(51) Int. Cl.
*B65D 75/32* (2006.01)
*B65B 7/16* (2006.01)
(Continued)

(52) U.S. Cl.
CPC ............ *B65D 75/326* (2013.01); *B65B 7/164* (2013.01); *B65B 25/008* (2013.01); *B32B 7/12* (2013.01);
(Continued)

(58) Field of Classification Search
CPC ...... B25B 25/008; B25B 7/164; B65D 75/326; B65D 2585/545; B32B 27/32; B32B 15/085; B32B 27/325; B32B 27/00; B32B 27/36; B32B 2307/31; B32B 2307/4023; B32B 2307/536; B32B 2307/7265;
(Continued)

(56) References Cited

U.S. PATENT DOCUMENTS 4,691,820 A * 9/1987 Martinez .............. B65D 75/326
206/205
4,918,133 A 4/1990 Moriya et al.
(Continued)

FOREIGN PATENT DOCUMENTS

EP 2803713 11/2014
WO WO2019223910 11/2019

*Primary Examiner* — Rafael A Ortiz

(57) ABSTRACT

The present invention is related to a contact lens package with a heat sealable multilayer packaging lidstock formed from:
  a support layer and
  a peelable seal layer made from a polymer blend, such polymer blend formed from a material:
  from 40 to 85% by weight of one or more first amorphous cyclic olefin polymer(s) characterized by a glass transition temperature of at least 120° C.
  from 10 to 55% by weight of one or more second amorphous cyclic olefin polymer(s) characterized by a glass transition temperature of less than 120° C., and
  from 0.5 to 15% by weight, preferably 0.5 to 10% by weight of at least one elastomeric copolymer comprising at least one polymerized monovinylarene and at least one polymerized acyclic olefin.

16 Claims, 5 Drawing Sheets

(51) Int. Cl.
  *B65B 25/00* (2006.01)
  *B32B 7/12* (2006.01)
  *B32B 15/085* (2006.01)
  *B32B 15/09* (2006.01)
  *B32B 27/32* (2006.01)
  *B32B 27/36* (2006.01)
  *B32B 15/20* (2006.01)

(52) U.S. Cl.
  CPC ............ *B32B 15/085* (2013.01); *B32B 15/09* (2013.01); *B32B 15/20* (2013.01); *B32B 27/325* (2013.01); *B32B 27/36* (2013.01); *B32B 2307/31* (2013.01); *B32B 2307/4023* (2013.01); *B32B 2307/536* (2013.01); *B32B 2307/7265* (2013.01); *B32B 2307/748* (2013.01); *B32B 2439/80* (2013.01); *B65D 2585/545* (2013.01)

(58) Field of Classification Search
  CPC .......... B32B 2307/748; B32B 2439/80; B32B 15/09; A45C 11/005; A45C 11/046
  USPC .................................. 206/5.1, 530
  See application file for complete search history.

(56) References Cited

U.S. PATENT DOCUMENTS

| | | | |
|---|---|---|---|
| 4,948,856 A | 8/1990 | Minchak et al. | |
| 5,331,057 A | 7/1994 | Brekner et al. | |
| 5,468,803 A | 11/1995 | Takahashi et al. | |
| 5,468,819 A | 11/1995 | Goodall et al. | |
| 5,609,246 A * | 3/1997 | Borghorst | B65D 77/2036 206/5.1 |
| 6,090,888 A | 7/2000 | Khanarian et al. | |
| 10,934,070 B2 | 3/2021 | Riis et al. | |
| 2002/0197478 A1 | 12/2002 | Muggli et al. | |
| 2004/0236024 A1 | 11/2004 | Rivett et al. | |
| 2004/0238380 A1 | 12/2004 | Newman | |
| 2006/0093846 A1 | 5/2006 | Chien | |
| 2011/0256373 A1 | 10/2011 | Tatarka et al. | |
| 2011/0308836 A1 | 12/2011 | Liu et al. | |
| 2012/0006695 A1 | 1/2012 | Kawal | |
| 2012/0021151 A1 | 1/2012 | Tatarka et al. | |
| 2012/0071605 A1 * | 3/2012 | Baugh | C08L 23/0823 525/75 |
| 2014/0116906 A1 * | 5/2014 | Trombley | A61J 1/067 206/438 |
| 2014/0183063 A1 * | 7/2014 | Lee | B65B 51/10 53/467 |
| 2014/0194024 A1 * | 7/2014 | Pham | C09D 145/00 428/221 |
| 2015/0041475 A1 * | 2/2015 | Swamy | B32B 1/02 220/359.3 |
| 2015/0259485 A1 | 9/2015 | Kunimoto | |
| 2016/0051020 A1 * | 2/2016 | Ansell | B32B 27/32 206/205 |
| 2016/0128903 A1 * | 5/2016 | Uetake | B65B 47/02 53/131.2 |
| 2016/0198825 A1 * | 7/2016 | Fawdington | A45C 11/005 206/5.1 |
| 2017/0001420 A1 | 1/2017 | Sebald | |
| 2017/0165901 A1 * | 6/2017 | Fischer | B29C 66/244 |

* cited by examiner

FIG. 4

Option 80

| Temp | Time | Pressure | Pkgs PIT Tested | PIT Failures | % PIT Failures | Skinning[2] | Peel Force[3] First Peak | Peel Force[3] Avg Load |
|---|---|---|---|---|---|---|---|---|
| 218c | 0.5s | 50psi | 210 | 27 | 12.9 | 2/36 | 3.2 | 1.3 |
| 218c | 0.7s | 50psi | 210 | 9 | 4.3 | 3/24 | 5 | 2 |
| 218c | 0.5s | 70psi | 204 | 15 | 7.4 | 0/36 | 4.2 | 1.2 |
| 218c | 0.7s | 70psi | 222 | 3 | 1.4 | 0/24 | 4.6 | 2 |
| 226c | 0.5s | 50psi | 192 | 14 | 7.3 | 0/36 | 3.8 | 1.45 |
| 226c | 0.7s | 50psi | 180 | 8 | 4.4 | 6/24 | 4.3 | 2.4 |
| 226c | 0.5s | 70psi | 180 | 14 | 7.8 | 0/36 | 4.9 | 1.8 |
| 226c | 0.7s | 70psi | 180 | 6 | 3.3 | 4/24 | 4.4 | 2.1 |

Option 81

| Temp | Time | Pressure | Pkgs PIT Tested | PIT Failures | % PIT Failures | Skinning[2] | Peel Force[3] First Peak | Peel Force[3] Avg Load |
|---|---|---|---|---|---|---|---|---|
| 218c | 0.5s | 50psi | 204 | 0 | 0 | 0/36 | 4.2 | 1.5 |
| 218c | 0.7s | 50psi | 198 | 0 | 0 | 1/24 | 4.2 | 2.1 |
| 218c | 0.5s | 70psi | 216 | 0 | 0 | 0/24 | 4.2 | 1.5 |
| 218c | 0.7s | 70psi | 210 | 0 | 0 | 1/24 | 4.8 | 2.1 |
| 226c | 0.5s | 50psi | 216 | 0 | 0 | 1/36 | 3.9 | 1.5 |
| 226c | 0.7s | 50psi | 210 | 0 | 0 | 18/24 | 5.3 | 2.8 |
| 226c | 0.5s | 70psi | 210 | 1 | 0.5 | 2/24 | 4.8 | 1.5 |
| 226c | 0.7s | 70psi | 210 | 0 | 0 | 6/36 | 5 | 2.2 |

PACKAGE FOR AN OPHTHALMIC DEVICE HAVING A MULTILAYER LIDSTOCK CONTAINING A CYCLIC OLEFIN SEAL LAYER

CROSS REFERENCE TO RELATED APPLICATION

The present application is a continuation application of U.S. patent application Ser. No. 15/987,418 filed on May 23, 2018 which is currently pending.

FIELD OF THE INVENTION

The present invention is related to a package for an ophthalmic device, in particular for a contact lens, having a multilayer lidstock having a seal layer comprising a cyclic olefin polymer. The multilayer lidstock exhibits a balanced combination of mechanical properties, peel-force and chemical inertness. The present invention is also related to packages comprising said film.

STATE OF THE ART

Polymeric films are used in a wide variety of packaging applications, including the packaging of food, pharmaceutical products and non-perishable consumer goods. Dependent on their application a typical combination of properties related to chemical resistance, heat resistance, moisture resistance, elasticity modulus, elongation and tensile strength at break, peel quality and optical properties among others are required.

Particularly in pharmaceutical product packaging applications it is of major importance that the composition of the content remains substantially unchanged over a reasonable period.

One of the reasons responsible for a composition change is the inadvertently absorption or adsorption of ingredients by the packaging film.

A reduction of such a composition change can be reached through the use of packaging composed of cyclic polyolefin (s).

Cyclic olefin polymers are described in a general manner in numerous patents, including U.S. Pat. Nos. 4,948,856; 5,331,057 and 5,468,819.

Unfortunately, cyclic polyolefin(s) are rigid and fragile, and further are poor in terms of heat-sealing properties. Thus, cyclic polyolefin polymers have been problematic in that a practical packaging is difficult to be processed with the cyclic polyolefin films of conventional film thickness and thus is particularly coupled with an increased risk of high waste.

Different approaches to circumvent the drawbacks inherent to a cyclic olefin polymer film have been the subject of a number of patents and patent applications.

In general, these approaches focus on blending the cyclic olefinic polymer with impact strength modifying (co)polymers, such as elastomeric copolymers.

U.S. Pat. No. 5,468,803 discloses a transparent thermoplastic norbornene polymer composition comprising a thermoplastic norbornene polymer having a number average molecular weight of 10,000-200,000 as determined by gel permeation chromatographic analysis in toluene, said norbornene polymer containing 0.01 to 10% by weight of a compounding ingredient in the form of a polymeric elastomer dispersed as micro-domains in the norbornene polymer.

US2004/0236024 discloses cycloolefinic polymer compositions exhibiting an advantageous balance of dimensional stability, improved impact resistance and superior optical properties comprising at least one cycloolefinic polymer comprising at least one cyclic mer and at least one acyclic mer, and at least one non-halogenated elastomeric copolymer comprising at least one aromatic vinyl mer and at least one saturated alkene mer, said elastomeric copolymer having an aromatic vinyl content of from 14 to 39 weight percent.

U.S. Pat. No. 6,090,888 discloses a composition blend which consists essentially of (i) a copolymer of norbornene and an acyclic olefin in a respective molar ratio of 1:1 and (ii) effective amounts of a styrene-butadiene-styrene copolymer modifier having up to 50 weight percent styrene content.

US 2011/0256373 discloses a melt-blend resin composition prepared by melt-blending from 60 parts to 94.5 parts by weight of an amorphous cyclic olefin polymer composition exhibiting a glass transition temperature in the range of from 30° C. to 200° C.; from 30-5 parts by weight of a thermoplastic elastomer; and (c) from 10 parts to 0.5 parts by weight of a partially crystalline, cyclic olefin elastomer of norbornene and ethylene having a glass transition temperature of less than 30° C., a crystalline melting temperature of less than 125° C. and a percentage crystallinity by weight of 40% or less.

US 2012/0071605 discloses a polymer composition comprising a blend comprising: (a) greater than 30% by weight of a cyclic olefin polymer having a glass transition temperature (Tg) greater than 60° C. and having a heat of fusion ($\Delta Hf$) of 40 J/g or less; (b) from 1 to 50% by weight of an acyclic olefin polymer modifier having a glass transition temperature of less than 0° C.; (c) from 0.1 to 50% by weight of a non-functionalized plasticizer having a kinematic viscosity at 100° C. of 3 to 3000 cSt, a viscosity index of 120 or more, a pour point of 0° C. or less and a flash point of 200° C. or more.

US 2015/0259485 discloses a cyclic olefin resin film comprising a cyclic olefin resin having a refractive index of n1 and a glass transition point of 170° C. or more, and at least one styrene based elastomer having a refractive index of n2 so that $\Delta n=|n2-n1|$ is 0.012 or less wherein the at least one styrene based elastomer has a melt index smaller than that of the cyclic olefin resin at 270° C. and at a load of 2.16 kg. The heat-resistant transparent film may contain two or more kinds of styrene elastomers, and the cyclic olefin resin may be a copolymer of norbornene and ethylene.

Film rigidity and inflexibility cause problems such as poor handling during processing of a multilayer film comprising a cyclic olefin polymer layer coupled with an increased risk of high waste.

SUMMARY OF THE INVENTION

The present invention provides a contact lens package having a bulb with a contact lens contained in solution placed in the bulb. The package has a lidstock sealed to the bowl. The lidstock is formed from a heat sealable multilayer packaging film and comprises a support layer and a peelable seal layer. The seal layer is formed from a polymer blend having: from 40 to 85% by weight of one or more first amorphous cyclic olefin polymer(s) characterized by a glass transition temperature of at least 120° C.; from 10 to 55% by weight of one or more second amorphous cyclic olefin polymer(s) characterized by a glass transition temperature of less than 120° C.; and from 0.5 to 15% by weight of at least one elastomeric copolymer comprising at least one polymerized monovinylarene and at least one polymerized acyclic olefin, wherein the monovinylarene content is up to 50% by weight and characterized by a Shore A hardness (30 sec), according to ASTM D 2240, comprised between 20 and 90; wherein the glass transition temperature being measured by Differential Scanning Calorimetry, according to ASTM D3418 with a heating gradient of 10° C./min.

Preferred embodiments of the lidstock of the contact lens package of the present invention disclose one or more of the following features:

- the first amorphous cyclic olefin polymer(s) of the peelable seal layer is characterized by an elongation at break, in accordance with EN ISO 527, of 30% or less, preferably of 20% or less;
- the second amorphous cyclic olefin polymer(s) of the peelable seal layer is characterized by an elongation at break, in accordance with EN ISO 527, of more than 30%, preferably of more than 40%;
- the cyclic olefin polymer is hydrogenated;
- the elastomeric copolymer is selected from the group consisting of styrene-isobutylene-styrene copolymer, styrene-ethylene-butylene-styrene copolymer, styrene-propylene-styrene copolymer, styrene-ethylene-propylene-styrene copolymer, styrene-isoprene copolymer, styrene-isoprene-styrene copolymer, styrene-isoprene-butadiene-styrene copolymer, styrene-isoprene-butadiene-styrene copolymer, styrene-butylene-butadiene-styrene copolymer and styrene-butadiene-styrene copolymer;
- the elastomeric copolymer is hydrogenated;
- the optional barrier layer comprises aluminum foil or other high barrier films such as: aluminum or silicone oxide coated polymer layer; metalized polymer layer; cyclic olefin copolymer (COC); and Aclar® (PCTFE).
- the support layer comprises at least one polymer layer selected from the group consisting of polyamide, polyester, polycarbonate, polyvinyl chloride, polypropylene, polyethylene, polyester-glycol copolymer and ethylene vinyl acetate;
- the thickness of the seal layer is comprised between 3 and 100 μm, preferably between 5 and 80 μm, more preferably between 7 and 50 μm, most preferably between 10 and 30 μm;
- the seal layer is characterized by a breaking stress, according to ASTM D882, of 65 N/mm² or less, preferably of 60 N/mm² or less, more preferably of 55 N/mm² or less;
- the seal layer is characterized by a modulus of elasticity, according to ASTM D882, of 2100 N/mm² or less, preferably of 2000 N/mm² or less.

The present invention further discloses a contact lens package, comprising the heat sealable multilayer packaging lidstock and a multilayer sealant film, comprising at least one cyclic olefin polymer layer in contact with the peelable seal layer of the heat-sealable multilayer film, heat-sealed on it.

Preferred embodiments of the package of the present invention disclose one or more of the following features:

- the peel strength, measured according to ASTM F88, is comprised between 1.0 and 15.0 N/15 mm, preferably between 2.0 and 10.0 N/15 mm.
- the package is sterilizable at 115° C. for 30 minutes or more, or at 121° C. for 15 minutes or longer, at 125 C for 12 minutes or longer, or at 130° C. for 10 minutes or longer.

The present invention further discloses a method for producing the heat-sealed package comprising:

- a bulb contacting the multilayer lidstock with the heat seal layer of the heat sealable monolayer or multilayer film and:
- sealing at a temperature comprised between 200 and 250° C., preferably between 210 and 240° C. using a dwell time comprised between 0.2 and 3 seconds, preferably between 0.5 and 2 seconds and a pressure comprised between 40 and 800 psi, preferably between 60 and 200 psi, and cooling the heat-sealed package.

BRIEF DESCRIPTION OF THE DRAWINGS

FIG. 4 is a table of various properties as determined by tests run on embodiments of the present invention;

DETAILED DESCRIPTION OF THE INVENTION

Figure 1:
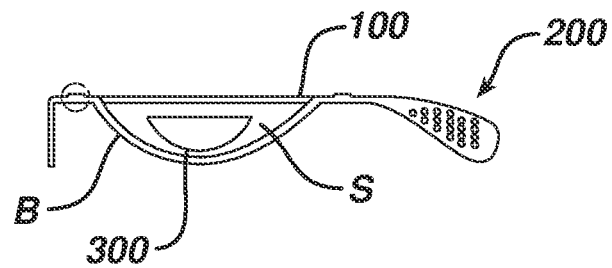
FIG. 1 is a side view of an embodiment of the base element and lidstock of a package of the invention, containing a bowl; a lid, and a solution for holding a lens.

According to the present invention there is provided a heat sealable multilayer lidstock comprising a support layer and an optional barrier layer, and a peelable seal layer of a polymer blend comprising a first cyclic olefin polymer, a second cyclic olefin polymer and at least one elastomeric copolymer, said elastomeric copolymer comprising at least one polymerized monovinylarene and at least one polymerized acyclic olefin, said peelable seal layer allowing a controlled peel-force of the multilayer film and a smooth peel area upon opening, said peelable seal layer further being characterized by a satisfying chemical inertness and resistance to penetration of substances.

The peelable seal layer of the present invention comprises a polymer blend comprising:

- from 40 to 85% by weight, preferably from 45 to 80% by weight of one or more first amorphous cyclic olefin polymer(s) characterized by a glass transition temperature of at least 120° C. and an elongation at break of 30% or less;
- from 10 to 55% by weight, preferably from 15 to 50% by weight of one or more amorphous cyclic olefin polymer(s) characterized by a glass transition temperature of less than 120° C. and an elongation at break of more than 30%; and
- from 0.5 to 15% by weight of at least one elastomeric copolymer comprising at least one polymerized monovinylarene and at least one polymerized acyclic olefin, wherein the monovinylarene content is up to 50% by weight and characterized by a Shore A hardness (30 sec) according to ASTM D 2240 comprised between 20 and 90, wherein: the glass transition temperature being measured by Differential Scanning Calorimetry, according to ASTM D3418 with a heating gradient of 10° C./min.;
- the elongation at break being determined by tensile testing in accordance with EN ISO 527;

Suitable cyclic olefin polymers for being used in the polymer blend of the peelable seal layer of the present invention include homopolymers or copolymers of any cyclic olefin monomers known in the art.

The cyclic olefin monomers in general are mono- or polyunsaturated polycyclic ring systems, such as cycloalkenes, bicycloalkenes, tricycloalkenes, tetracycloalkenes, pentacycloalkenes and hexacycloalkenes which may be mono- or polysubstituted.

Non-limiting examples of suitable cyclic olefin monomers include bicyclo[2,2,1]hept-2-ene, 5-methylbicyclo[2,2,1]hept-2-ene, 10-methyltricyclo[$4.4.0.1^{2,5}$]-3-undecene, tetracyclo[$4.4.0.1^{2,5}.1^{7,10}$]-3-dodecene, 8-methyltetracyclo[$4.4.0.1^{2,5}.1^{7,10}$]-3-dodecene, pentacyclo[$7.4.0.1^{2,5}.1^{9,12}.0^{8,13}$], hexacyclo[$6.6.1.1^{3,6}.1^{10,13}.0^{2,7}.0^{9,14}$]-4-heptadecene and tricyclo[$5.2.1.0^{2,6}$]deca-3,8-diene.

The cyclic olefin polymers are produced by ring-opening metathesis polymerization of one or more cyclic olefin monomers.

The cyclic olefin polymers for being used in the polymer blend of the peelable seal layer of the present invention preferably comprise hydrogenated homopolymers or copolymers of bicyclo[2,2,1]hept-2-ene, 8-methyltetracyclo[$4.4.0.1^{2,5}.1^{7,10}$]-3-dodecene and tricyclo[$5.2.1.0^{2,6}$]deca-3,8-diene.

Preferably the cyclic olefin polymer is hydrogenated. When an unsaturated bond remaining in the molecular chain of cyclic polyolefin is saturated by hydrogenation, the hydrogenation rate is preferably 90% or more, more preferably 95% or more, and particularly preferably 99% or more.

The cyclic olefin polymer is preferably characterized by a number average molecular weight comprised between 10,000 and 200,000, preferably between 20,000 and 100,000, more preferably between 25,000 and 50,000 g/mole, measured by gel permeation chromatography using toluene as a solvent, relative to polystyrene.

The vinyl aromatic elastomeric copolymer used in the polymer blend of the peelable seal layer of the present invention is preferably a block polymer in which the aromatic portion is a polymer of styrene, α-methylstyrene, (o-, m-, p-)methylstyrene or 1,3-dimethylstyrene and preferably a polymer of styrene, and wherein the elastomeric portion is an unsaturated polymer of butadiene and/or isoprene, or the hydrogenated derivative thereof, or a saturated olefin polymer of ethylene/butylene or ethylene/propylene.

The vinyl aromatic elastomer is preferably characterized by a weight average molecular weight comprised between 20,000 and 500,000, preferably between 30,000 and 450,000, more preferably between 50,000 and 400,000 g/mole, measured by gel permeation chromatography using toluene as a solvent, relative to polystyrene.

Preferably the vinyl aromatic elastomer is hydrogenated. When an unsaturated bond remaining in the molecular chain of vinyl aromatic elastomer is saturated by hydrogenation, the hydrogenation rate is preferably 90% or more, more preferably 95% or more, and particularly preferably 99% or more The vinyl aromatic elastomer preferably is selected from the group consisting of styrene-isobutylene-styrene copolymer, styrene-ethylene-butylene-styrene copolymer, styrene-propylene-styrene copolymer, styrene-ethylene-propylene-styrene copolymer, hydrogenated styrene-isoprene copolymer, hydrogenated styrene-isoprene-styrene copolymer, hydrogenated styrene-isoprene-butadiene-styrene copolymer, hydrogenated styrene-isoprene-butadiene-styrene copolymer, hydrogenated styrene-butylene-butadiene-styrene copolymer and hydrogenated styrene-butadiene-styrene copolymer.

More preferably the vinyl aromatic elastomer is styrene-ethylene-butylene-styrene copolymer (SEBS) or styrene-ethylene-propylene-styrene copolymer (SEPS).

The vinyl aromatic elastomer is characterized by a vinyl aromatic content of up to 50% by weight and by a Shore A hardness (30 sec) according to ASTM D 2240 comprised between 20 and 90, preferably between 30 and 80.

The particular combination of cyclic olefin polymers and vinyl aromatic polymer(s) allow the realization of a polymer blend characterized by an elasticity modulus, according to ASTM D882, of 2100 N/mm$^2$ or less, preferably of 2000 N/mm$^2$ or less and a stress at break, according to ASTM D882, of 65 N/mm$^2$ or less, preferably of 60 N/mm$^2$ or less, more preferably of 55 N/mm$^2$ or less.

Both the elasticity modulus and the stress at break of the intimate polymer blend of the present invention, are lower than the theoretical value based on the proportional contribution of the respective values of the first cyclic olefin polymer and of the blend of the second cyclic olefin polymer and the vinyl aromatic elastomer, constituting the seal layer, i.e. lower than the theoretical elasticity modulus or stress at break calculated from the sum of the elasticity modulus or the stress at break of a 100% first cyclic olefin polymer layer, multiplied by its weight fraction as in the seal layer of the present invention, and of the elasticity modulus or the stress at break of a layer consisting of an intimate blend of the second cyclic olefin polymer and the vinyl aromatic polymer, in the ratio as in the seal layer of the present invention, multiplied by the weight fraction of the second olefin polymer and the vinyl aromatic elastomer as in the seal layer of the present invention, wherein the weight fraction equals the weight percentage divided by 100.

The thickness of the peelable seal layer is in general comprised between 3 and 100 μm, preferably between 5 and 80 μm, more preferably between 7 and 50 μm, most preferably between 10 and 30 μm.

The heat sealable multilayer lidstock used with a contact lens package, as disclosed in the present invention comprises a support layer and an optional barrier layer, said support layer preferably comprising at least one polymer layer selected from the group consisting of polyamide, polyester, polycarbonate, polyvinyl chloride, polypropylene, low density polyethylene, medium density polyethylene, high density polyethylene, polyester-glycol copolymer and ethylene vinyl acetate.

The support layer and optional barrier layer further may comprise one or more of the following barrier films in the structure: aluminum foil, aluminum oxide foil or silicone oxide ($Al_2O_3$ or $SiO_2$); a coated polymer layer; a metalized polymer layer; a cyclic olefin copolymer (COC); or Aclar® (PCTFE.)

Monolayer or multilayer sealant films used with a contact lens package as described in the present invention can be produced by known methods. However, it is generally preferred to produce them by coextruding melts of the polymers and additives required for the various layers of the final films, followed by cooling to solidify the polymers in the form of a film.

Films in accordance with the present invention can also be produced by coextrusion coating of the heat seal layer on to a suitable support layer or barrier layer.

The support layer of the multilayer packaging lidstock used with a contact lens package as in the present invention typically comprises a polyester layer, such as a polyethylene terephthalate layer, with a thickness comprised between 5 and 60 µm, preferably between 10 and 40 µm; the barrier layer is an aluminum foil with a thickness comprised between 20 and 70 µm, preferably between 30 and 60 µm and the peelable seal layer with a thickness comprised between 10 and 30 µm, most preferably between 20 and 30 µm.

The heat sealable multilayer lidstock used with a contact lens package as in the present invention is used to produce peelable heat sealed packages through heat sealing said multilayer lidstock to a substrate wherein the substrate is a cyclic olefin polymer substrate or comprises a cyclic olefin polymer layer for contacting the peelable seal layer upon heat sealing.

The heat sealable multilayer lidstock used with a contact lens package as in the present invention may be used to produce peelable heat sealed packages through heat sealing said multilayer lidstock to a substrate at a temperature comprised between 200 and 250° C., preferably between 210 and 240° C. using a dwell time comprised between 0.2 and 3 seconds, preferably between 0.5 and 2 seconds and a pressure comprised between 100 and 500 kPa, preferably between 150 and 250 kPa.

Peelable packages produced from the multilayer films and the cyclic olefin comprising substrate have shown peel strengths, for separating the multilayer film and the substrate, measured according to ASTM F88, comprised between 1.0 and 15.0 N/15 mm, preferably between 2.0 and 10.0 N/15 mm. Peeling strengths are measured with an Instron tensile tester at a 180° peel angle with an opening speed of 300 mm/min.

Peel strength of the package, of the present invention, is lower than the theoretical peel strength value calculated from the proportional contribution of the respective peel strength values of a seal layer of the first cyclic olefin polymer and of a seal layer consisting of a blend of the second cyclic olefin polymer and the vinyl aromatic elastomer, wherein the proportions are as in the seal layer of the present invention; i.e. lower than the theoretical peel strength calculated from the sum of the peel strength of a 100% first cyclic olefin polymer seal layer, multiplied by its weight fraction as in the seal layer of the present invention, and of the peel strength of a seal layer consisting of an intimate blend of the second cyclic olefin polymer and the vinyl aromatic polymer, in the ratio as in the seal layer of the present invention, multiplied by the weight fraction of the second olefin polymer and the vinyl aromatic elastomer as in the seal layer of the present invention, wherein the weight fraction equals the weight percentage divided by 100.

Both phenomena, the anti-synergistic effect of blending the first cyclic olefin polymer, the second olefin polymer and the vinyl aromatic elastomer on the mechanical properties (elasticity modulus and tensile strength at break) and on the force to open a package, allow to create a thin cyclic olefin polymer-based heat seal layer with a film thickness below 100 µm, preferably below 60 µm, more preferably below 40 µm, that are easily processable on blown and cast extrusion lines without web breakages, while having controlled peel-forces resulting in clean peels without fiber tears or angel hairs implying that the peel trace is smooth and exempt from all kind of visual disruptions.

Packages processed by heat sealing the multilayer lidstock used with a contact lens package as in the present invention on a cyclic olefin polymer surface of the substrate have proven to be resistant to penetration of substances enclosed in the package, into the cyclic olefin polymer matrix i.e. the packages have proven non-scalping properties, assuming that the contents of the packaging are into direct contact with the cyclic olefin polymer.

By "substances," the present invention means pharmaceutical agents, and flavor and aroma substances, or parts thereof.

The packages according to the present invention can preferably be sterilized at 121° C. for at least 18 minutes, more preferably 30 minutes or longer.

EXAMPLES

The following illustrative examples are merely meant to exemplify the present invention but is not destined to limit or otherwise define the scope of the present invention.

Preparation of a Contact Lens Package

A peelable sealant film (seal layer) was prepared from a polymer blend comprising the first cyclic olefin polymer Zeonor® 1430R (alternately, ZEONEX® 690R may be used) characterized by a glass transition temperature of 136° C. and an elongation at break of 16%, the second cyclic olefin polymer Zeonor® 1020R characterized by a glass transition temperature of 102° C. and an elongation at break of 90%, and the vinyl aromatic elastomer Kraton® G1643M characterized by a styrene content of 20% by weight and a Shore A hardness (30 sec) of 52, in weight percentages as given in table 1.

The glass transition temperature was determined with the Q200 DSC from TA Instruments, according to ASTM D3418. Samples were heated to 220° C. with a speed of 50° C./min in the first run followed by a cooling step to −20° C. at 10° C./min. The glass transition temperature was measured during the second heating cycle with a speed of 10° C./min.

A 30 µm film was produced on 3-layer 600 mm wide cast line equipped with a Chloeren combining system and two 45 mm and one 60 mm Egan-Davis standard extruders. Prior to extrusion all polymers were pre-dried to remove air and oxygen to prevent discoloration, carbide formation and voids in the film. Additionally, $N_2$ was added to the extruder hopper and the extrusion feeding section.

Elasticity modulus and Stress at break were measured on pure films according to ASTM D882 and are reproduced in table 1. The film dimensions for testing were 125 mm length and 15 mm width. The pull velocity of the clamps was 25 mm/min. A load cell of 250 N was applied.

Prior to sealing, the peelable layer was adhesively laminated against a OPET 12 µm/Aluminum foil 50 µm laminate to form multilayer film (lidstock structure). The multilayer film was sealed on the multilayer film; sealing was performed with peelable layer against peelable layer with a Kopp sealer using 400 N/20 cm² pressure during 1 sec and with 1 heated seal bar at a temperature of 220° C. and 230° C. respectively. Films were sealed in machine direction and opened in cross direction at a pull velocity of the tensile tester of 300 mm/min. Sample widths of 15 mm were applied. Peel strength values, according to ASTM F88, are reproduced in Table 1.

The peel aspect is evaluated visually, wherein (+) stands for fiber tears and angel hairs observed over the complete surface of the peel; (++) stands for a few angel hairs observed over part of the surface of the peel; and (+++) stands for a complete intact peel surface.

TABLE 1

| 1 | 2 % | 3 % | 4 % | 5 N/mm² | 6 N/mm² | 7 N/15 mm | 8 N/15 mm | 9 Eval. |
|---|---|---|---|---|---|---|---|---|
| Ex. 1 | 100 | 0.0 | 0.0 | 2200 | 66 | 1.9 | 7.2 | + |
| Ex. 2 | 80 | 19.0 | 1.0 | 1940 | 55 | 2.5 | 7.6 | ++ |
| Ex. 3 | 65 | 33.5 | 1.5 | 1883 | 46 | 3.2 | 10.6 | ++ |
| Ex. 4 | 50 | 48.0 | 2.0 | 1657 | 42 | 5.2 | 13.5 | +++ |
| Ex. 5 | 0 | 95.0 | 5.0 | 1595 | 33 | 15.9 | 24.9 | +++ |

NUMERAL REFERENCES 1. examples;
2. weight percentage of the first cyclic olefin polymer (Zeonor® 1430R)—as noted above, Zeonex 690R may also be used;
3. weight percentage of the second cyclic olefin polymer (Zeonor® 1020R);
4. weight percentage of the vinyl aromatic elastomer (Kraton® G1643M);
5. elasticity modulus, in N/mm², according to ASTM D882;
6. stress at break, in N/mm², according to ASTM D882;
7. peel strength, according to ASTM F88, in N/15 mm, for a sealing temperature of 220° C.;
8. peel strength, according to ASTM F88, in N/15 mm, for a sealing temperature of 230° C.;
9. visual evaluation of the peel region;

Example 1 and 5 are comparative examples. Example 1 has only a first polymeric cyclic olefin and the peel gives angel hairs. Example 5 only uses a second cyclic olefin polymer and an elastomer leading to a glass transition temperature lower than usual sterilization temperatures, additionally to too high peel strength values (too high opening forces).

Figure 2:
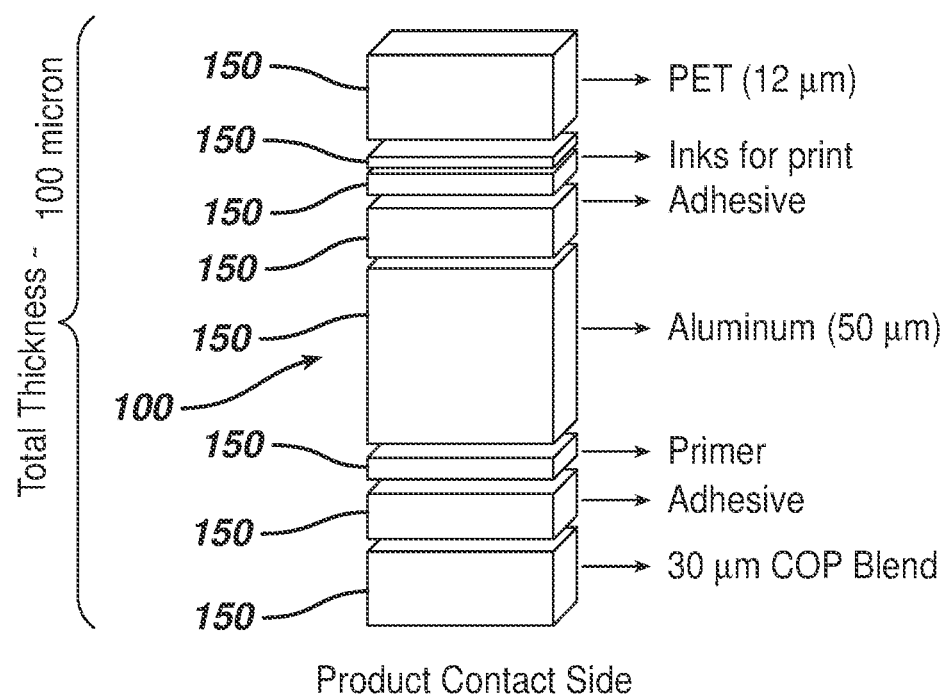
FIG. 2 is a graphic block representation of a novel lidstock for use of the package of FIG. 1.

In an illustrative embodiment 100 as shown in FIG. 1, a lidstock 100 is made according to the following current invention. This lidstock 100 may contain one or more layers 150, in order to improve functional or processing characteristics. The thickness of the lidstock is in the range of 30-100 micrometers, with layers such as those indicated in the cross section identified in FIG. 2. The lidstock 100 is intended to be heat sealed to the bowl B of package 200. Inside the package 200 is placed a contact lens 300 in solution S, typically saline.

Material selection criteria for the lidstock 100 were based on processability of the sealant film and package performance attributes, such as package integrity, prevention of drug (ketotifen) uptake into the package or lidstock, and security of adhesion simultaneous with ease of package opening. As will be seen, the selected material options at a batch stage were then produced under commercial-type conditions at a later stage.

Figure 3:
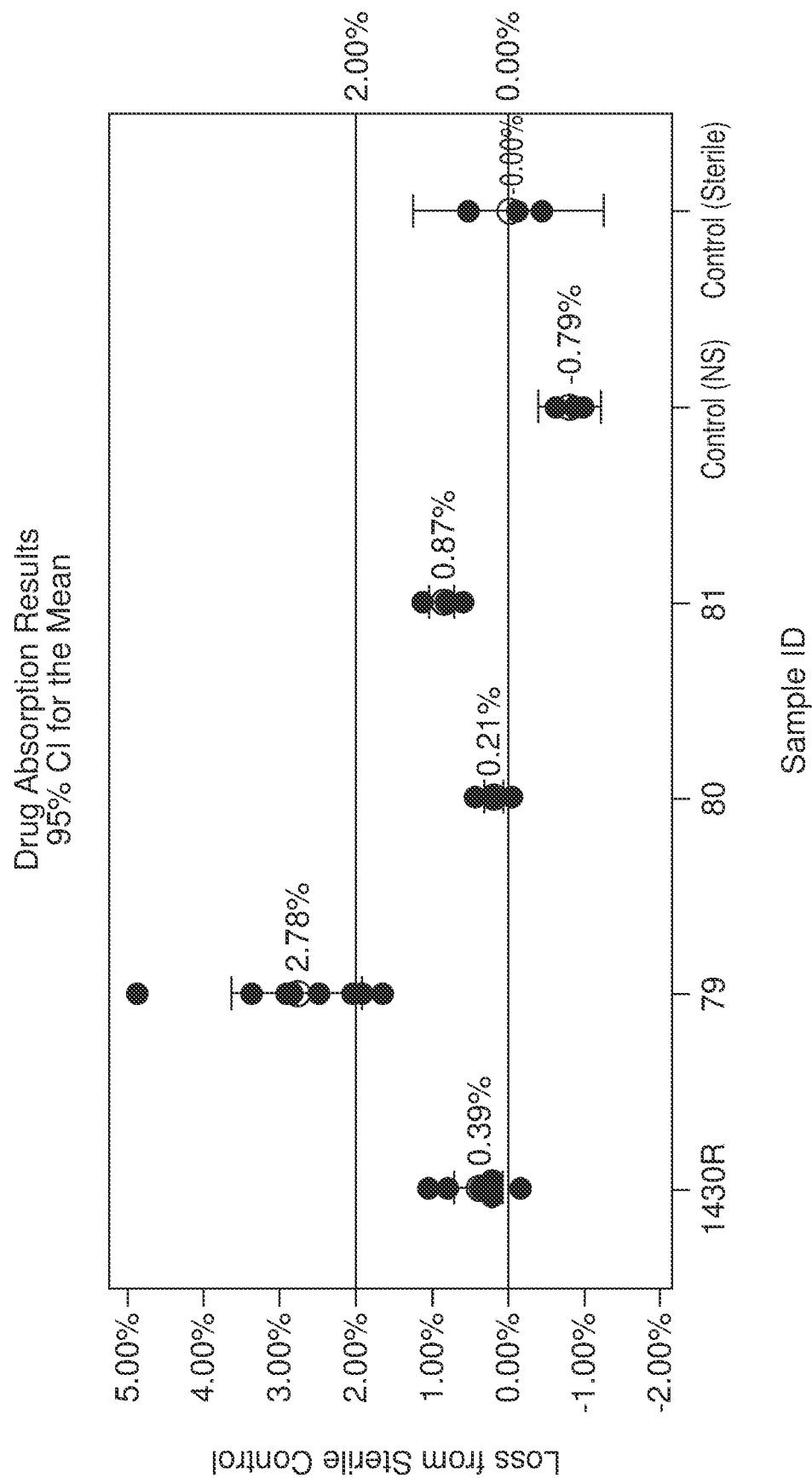
FIG. 3 is a graph of drug absorptive results for tests run on samples of versions of the present invention.

Two COP blend sealant films with the composition as provided in Table 1 were produced and evaluated for drug uptake:
K16/80 is a 20/80 COP blend sealant film which is produced using 80% of first polymeric cyclic olefin (ZEONOR® 1430R) and the remaining 20% is a blend of second cyclic olefin polymer and an elastomer; and
K16/81, is a 50/50 COP blend sealant film consisting of 50% of first polymeric cyclic olefin (ZEONOR® 1430R) and the remaining 50% is a blend of second cyclic olefin polymer and an elastomer.
Drug uptake of the Contact Lens Package Drug uptake testing was performed on both films (as well as a third which was rejected for performance) by sterilizing them with buffered ketotifen solution and the data is shown in the chart of FIG. 3.

Packages were heat sealed using both the option 80 (with K 16/80 sealant film) and option 81 (with K16/81 sealant film) lidstocks on a "6-up lab sealer" (Sohacki Industries) and steam sterilized. The packages consisted of contact lens and buffered Ketotifen solution. The package integrity, skinning (delamination between aluminum foil and seal layer during package opening), and peel force testing were performed on sterilized packages.

From the data seen in FIG. 4, both produced acceptable results. By looking at package integrity, drug uptake, skinning and processability, we then proceeded to commercial-grade batches for two structures, one with 35/65 blend ratio (Example 3, Table 1), and the second with a 50/50 blend ratio.

Figure 5:
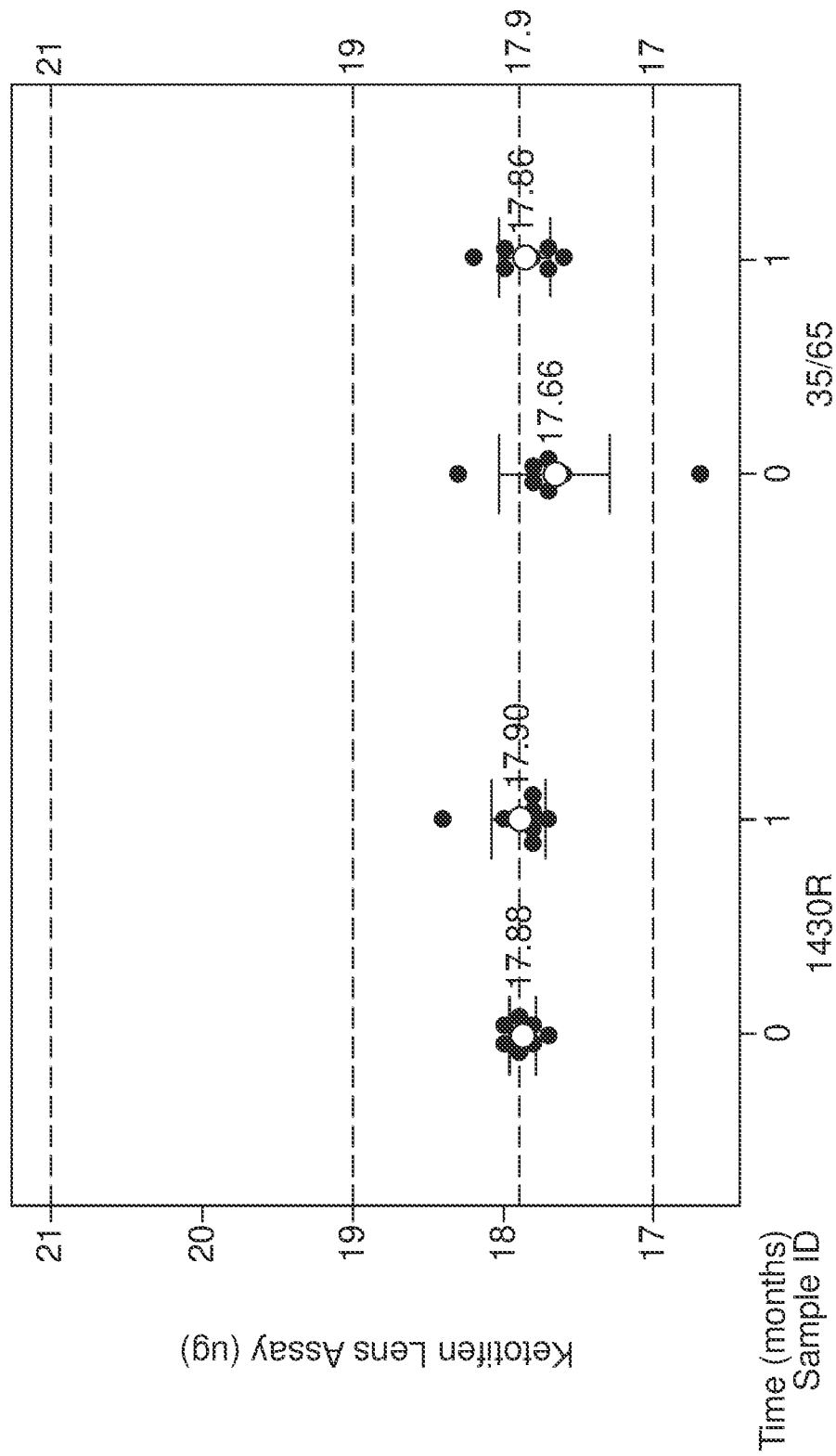
FIG. 5 is a table demonstrating assay tests on samples made according to the present invention.

The two films were produced on a commercial line for testing and evaluation. Even though acceptable as seen in the uptake test results as outlined in FIG. 5, where the 35/65 blend is the lowest rated, at an average of 17.66 microgram uptake, the drug uptake was higher with the 50/50 blend lidstock and therefore was eliminated from further testing and consideration. Drug uptake performance of the 35/65 blend was found to be acceptable.

After analysis of the results the inventors decided to make the 20/80 blend option with ZEONEX® 690R a priority for the following reasons:
Higher confidence in meeting the drug uptake requirement
ZEONEX® 690R is a medical grade resin
The yield and quality of film with ZEONEX® 690R was better than the film with ZEONOR® 1430R.

Figure 6:
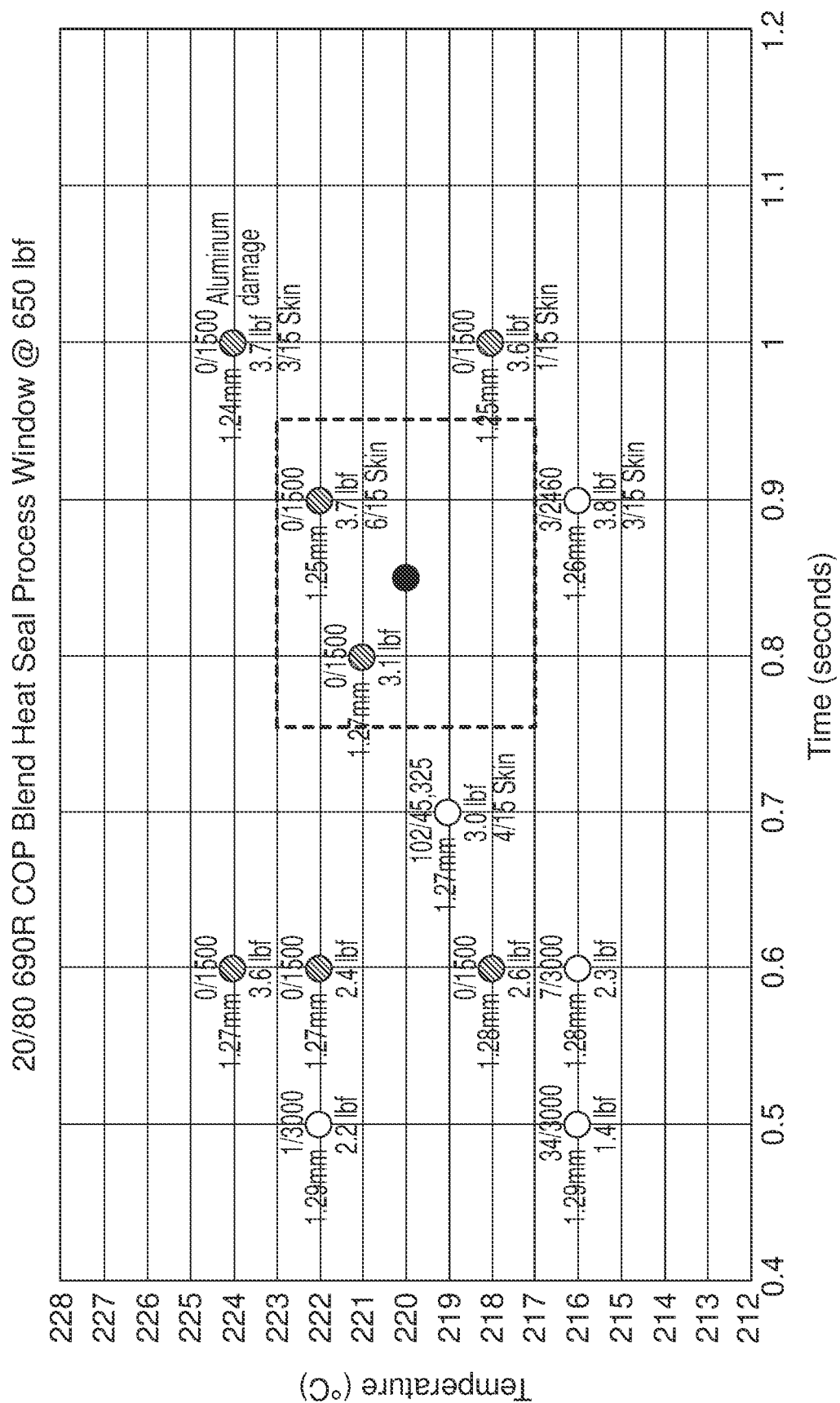
FIG. 6 is a graph of performance of various polymers formed into types of packages made according to the present invention

Packages produced using lidstock with 20/80 blend (with ZEONEX® 690R) sealant film passed package integrity and demonstrated acceptable peel force with minimal skinning as seen in FIG. 6.

We concluded that the ability to process the COP blend resin on a cast line is better than that of 100% COP resin, and results in better yield and quality of film during extrusion. The 20/80 Zeonex 690R COP blend lidstock has shown similar drug uptake as 100% 1430R or 690R lidstock. The 20/80 Zeonex 690R blend film is compliant with USP 87 and USP 661.1 requirements, and passes the extractability study on 20/80 690R blend film with acceptable results.

The invention claimed is:
1. A contact lens package comprising:
a bulb with a contact lens contained in solution therein; and
a lidstock sealed to the bulb, the lidstock formed from a heat sealable multilayer packaging film and comprising:
a support layer and
a peelable seal layer comprising a polymer blend, said polymer blend comprising:

from 40 to 85% by weight of one or more first amorphous cyclic olefin polymer(s) characterized by a glass transition temperature of at least 120° C.;
from 10 to 55% by weight of one or more second amorphous cyclic olefin polymer(s) characterized by a glass transition temperature of less than 120° C.; and
from 0.5 to 15% by weight of at least one elastomeric copolymer comprising at least one polymerized monovinylarene and at least one polymerized acyclic olefin, wherein the monovinylarene content is up to 50% by weight and characterized by a Shore A hardness according to ASTM D 2240, comprised between 20 and 90;
wherein the glass transition temperature being measured by Differential Scanning calorimetry, according to ASTM D3418 with a heating gradient of 10° C./min.

2. The package according to claim 1, wherein:
the first amorphous cyclic olefin polymer of the peelable seal layer is characterized by an elongation at break of 30% or less; and
the second amorphous cyclic olefin polymer of the peelable seal layer is characterized by an elongation at break of more than 30%,
the elongation at break being determined by tensile testing in accordance with EN ISO 527.

3. The package according to claim 1, wherein the cyclic olefin polymer is hydrogenated.

4. The package according to claim 1, wherein the elastomeric copolymer is selected from the group consisting of styrene-isobutylene-styrene copolymer, styrene-ethylene-butylene-styrene copolymer, styrene-propylene-styrene copolymer, styrene-ethylene-propylene-styrene copolymer, styrene-isoprene copolymer, styrene-isoprene-styrene copolymer, styrene-isoprene-butadiene-styrene copolymer, styrene-isoprene-butadiene-styrene copolymer, styrene-butylene-butadiene-styrene copolymer and styrene-butadiene-styrene copolymer.

5. The package according to claim 1, wherein the elastomeric copolymer is hydrogenated.

6. The package according to claim 1, wherein the support layer comprises at least one polymer layer selected from the group consisting of polyamide, polyester, polycarbonate, polyvinyl chloride, polypropylene, polyethylene, polyesterglycol copolymer and ethylene vinyl acetate.

7. The package according to claim 1, wherein the thickness of the peelable seal layer is comprised between 3 and 100 μm.

8. The package according to claim 1, wherein the seal layer is characterized by a stress at break, according to ASTM D882, of 65 N/mm$^2$ or lower.

9. The multilayer package according to claim 1, wherein the seal layer is characterized by a modulus of elasticity, according to ASTM D882, of 2100 N/mm$^2$ or lower.

10. A package according to claim 1, comprising a heat sealable multilayer and a lidstock comprising at least one cyclic olefin polymer layer in contact with the peelable seal layer of the heat-sealable multilayer film, and heat-sealed thereto.

11. The package according to claim 10, characterized in that the peel strength, measured according to ASTM F88, is between 2.0 and 10.0 N.

12. The package according to claim 10, characterized in that said package is sterilizable at 121° C. for 30 minutes or longer.

13. A method for producing a contact lens package comprising:
a bulb with a contact lens contained in solution therein; and
a lidstock sealed to the bulb, the lidstock formed from a heat sealable multilayer packaging film and comprising:
a support layer and
a peelable seal layer comprising a polymer blend, comprising from 40 to 85% by weight of one or more first amorphous cyclic olefin polymer(s) characterized by a glass transition temperature of at least 120° C.;
said method comprising:
contacting the support layer with the heat seal layer of the heat sealable lidstock and sealing at a temperature between 200 and 250° C., using a dwell time comprised between 0.2 and 3 seconds, at a pressure comprised between 100 and 500 kPa; and
cooling the heat-sealed package.

14. The method of claim 13 wherein said polymer blend comprises:
from 10 to 55% by weight of one or more second amorphous cyclic olefin polymer(s) characterized by a glass transition temperature of less than 120° C.

15. The method of claim 13 wherein said polymer blend further comprises:
from 0.5 to 15% by weight of at least one elastomeric copolymer comprising at least one polymerized monovinylarene and at least one polymerized acyclic olefin, wherein the monovinylarene content is up to 50% by weight and characterized by a Shore A hardness according to ASTM D 2240, comprised between 20 and 90;
wherein the glass transition temperature being measured by Differential Scanning calorimetry, according to ASTM D3418 with a heating gradient of 10° C./min.

16. A contact lens package comprising:
a bulb with a contact lens contained in solution therein; and
a lidstock sealed to the bulb, the lidstock formed from a heat sealable multilayer packaging film and comprising:
a support layer and
a peelable seal layer comprising a polymer blend, said polymer blend comprising:
from 45 to 80% by weight of at least one amorphous first cyclic olefin polymer characterized by a glass transition temperature of at least 130° C.;
from 15 to 50% by weight of at least one second amorphous cyclic olefin polymer characterized by a glass transition temperature of less than 110° C.; and
from 0.5 to 10% by weight of at least one elastomeric copolymer comprising at least one polymerized monovinylarene and at least one polymerized acyclic olefin, wherein the monovinylarene content is up to 50% by weight and characterized by a Shore A hardness according to ASTM D 2240, comprised between 20 and 90;
wherein the glass transition temperature being measured by Differential Scanning calorimetry, according to ASTM D3418 with a heating gradient of 10° C./min.

* * * * *